United States Patent
Warmuth et al.

(10) Patent No.: US 9,459,007 B2
(45) Date of Patent: Oct. 4, 2016

(54) LOW PROFILE VENT TERMINAL WITH VARIABLE EXHAUST ANGLE

(71) Applicant: Carrier Corporation, Farmington, CT (US)

(72) Inventors: David Warmuth, Plainfiled, IN (US); Gary E. Georgette, Avon, IN (US); Robert W. Peitz, Fishers, IN (US)

(73) Assignee: CARRIER CORPORATION, Farmington, CT (US)

( * ) Notice: Subject to any disclaimer, the term of this patent is extended or adjusted under 35 U.S.C. 154(b) by 579 days.

(21) Appl. No.: 13/954,076

(22) Filed: Jul. 30, 2013

(65) Prior Publication Data

US 2014/0034046 A1 Feb. 6, 2014

Related U.S. Application Data

(60) Provisional application No. 61/678,376, filed on Aug. 1, 2012.

(51) Int. Cl.
| | |
|---|---|
| *F23J 13/06* | (2006.01) |
| *F24H 9/00* | (2006.01) |
| *B23P 19/00* | (2006.01) |
| *F23L 17/04* | (2006.01) |
| *F24F 7/00* | (2006.01) |

(52) U.S. Cl.
CPC ............... *F23J 13/06* (2013.01); *B23P 19/00* (2013.01); *F23L 17/04* (2013.01); *F24H 9/0052* (2013.01); *F24H 9/0057* (2013.01); *F23J 2211/10* (2013.01); *F23J 2900/13005* (2013.01); *F24F 2007/003* (2013.01); *Y10T 29/49826* (2015.01)

(58) Field of Classification Search
USPC ................... 126/85 B; 431/10; 454/237, 243
See application file for complete search history.

(56) References Cited

U.S. PATENT DOCUMENTS

| 1,975,316 | A | | 10/1934 | Ferris |
| 3,541,945 | A | | 11/1970 | Wexler |
| 3,650,512 | A | | 3/1972 | Gee et al. |
| 3,680,541 | A | | 8/1972 | Honaker, Jr. |
| 3,994,280 | A | | 11/1976 | Winters et al. |
| 4,494,598 | A | | 1/1985 | DeHaan et al. |
| D292,312 | S | | 10/1987 | Van Ee |
| D320,267 | S | | 9/1991 | Thomas |
| 5,062,354 | A | * | 11/1991 | Goins ............ F23L 17/04 126/307 A |
| 5,282,456 | A | | 2/1994 | Smelcer et al. |
| 6,039,041 | A | * | 3/2000 | Barth ............ F23L 17/04 126/312 |

(Continued)

FOREIGN PATENT DOCUMENTS

| CA | 2354805 A1 | 3/2002 |
| CA | 2484734 A1 | 11/2003 |

*Primary Examiner* — Avinash Savani
(74) *Attorney, Agent, or Firm* — Cantor Colburn LLP (57) ABSTRACT

Vent terminal apparatus and methods are provided for covering vent pipes in an HVAC system, e.g., air intake and combustion gas exhaust pipes of a furnace or boiler. The vent terminal includes a body defining a shielded air inlet configured to fluidly communicate with an air intake pipe, and an exhaust opening configured to fluidly communicate with an exhaust pipe. The vent terminal also includes a nozzle configured to couple with the body and defining a flowpath therethrough. When the exhaust opening of the body is in fluid communication with the exhaust pipe and the nozzle is coupled with the body, the flowpath is in fluid communication with the exhaust pipe via the exhaust opening and the flowpath is oriented at an acute angle relative to the exhaust pipe.

17 Claims, 6 Drawing Sheets

(56) References Cited

U.S. PATENT DOCUMENTS

| | | |
|---|---|---|
| 6,227,191 B1 | 5/2001 | Garloch |
| 6,289,886 B1 | 9/2001 | Radke |
| 6,305,369 B1 | 10/2001 | Garloch |
| 2010/0089382 A1 | 4/2010 | Brown et al. |
| 2011/0174890 A1 | 7/2011 | Kumar |

* cited by examiner

LOW PROFILE VENT TERMINAL WITH VARIABLE EXHAUST ANGLE

CROSS-REFERENCE TO RELATED APPLICATION

This application claims priority to U.S. Provisional Patent Application Ser. No. 61/678,376, filed on Aug. 1, 2012, which is incorporated herein by reference in its entirety.

BACKGROUND

High-efficiency, condensing gas furnaces are typically vented through an exterior wall of a building using two pipes. One of the pipes is provided for air intake to support combustion in the furnace, and the other for exhaust gas discharge of the combustion gas products. Typically the exhaust gas exits perpendicular to the plane of the building wall, either through a bare pipe, or through an aesthetic vent terminal installed over the pipes. To meet local codes, however, it is sometimes necessary to redirect the exhaust at a non-perpendicular angle with respect to the plane of the building wall. This may be required by some jurisdictions to avoid exhaust gas from one building being directed to the intake pipe of an adjacent building.

One way presently used to address this non-perpendicular venting requirement is to provide an elbow at the terminus of the exhaust pipe. The elbow projects outward from the wall, bending to provide the required angle for the exhaust. This provides one solution for the challenge, and serves a secondary function of separating the exhaust gas from the intake pipe by directing the exhaust gas away from the intake pipe. However, a bare elbow jutting out from the sidewall of the building is often perceived as providing an unfinished appearance, not in keeping with the aesthetics of most buildings.

What is needed, then, is an apparatus and method for covering an intake and exhaust of an HVAC system, which provides a finished aesthetic and directs the exhaust gas at a non-perpendicular angle.

SUMMARY

Embodiments of the disclosure may provide a vent terminal for covering combustion vent pipes of an HVAC system. The vent terminal includes a body defining a shielded air inlet configured to fluidly communicate with an air intake pipe, and an exhaust opening configured to fluidly communicate with an exhaust pipe. The vent terminal also includes a nozzle defining a flowpath therethrough. When the exhaust opening of the body is in fluid communication with the exhaust pipe and the nozzle is coupled with the body, the flowpath is in fluid communication with the exhaust pipe via the exhaust opening and the flowpath is oriented at an acute angle relative to the exhaust pipe.

Embodiments of the disclosure may further provide a method for covering vent pipes of an HVAC system. The method includes coupling a backplate of a vent terminal to the vent pipes, the backplate defining an air intake opening aligned with an air intake pipe of the vent pipes and defining a first exhaust opening aligned with an exhaust pipe of the vent pipes. The method also includes coupling a cover to the backplate so as to define a shielded air intake communicating with the air intake pipe via the air intake opening. The cover defines a second exhaust opening aligned with the first exhaust opening. The method also includes determining an orientation for a nozzle from a plurality of possible orientations, and coupling the nozzle in the orientation to the cover, the backplate, or both, such that the nozzle fluidly communicates with the exhaust pipe via the first and second exhaust gas openings and is configured to direct exhaust gas received from the exhaust pipe at an acute angle with respect to the wall.

Embodiments of the disclosure may also provide an apparatus for covering vent pipes of a condensing gas furnace. The apparatus includes a backplate configured to be secured to a wall and including first and second pipe couplings. The first pipe coupling is configured to couple with an air intake pipe of the vent pipes, and the second pipe coupling is configured to couple with an exhaust pipe of the vent pipes. The backplate defines an air inlet opening configured to fluidly communicate with the air inlet pipe and a first exhaust gas opening configured to fluidly communicate with the exhaust pipe. The apparatus also includes a cover coupled with the backplate such that the backplate is configured to be disposed intermediate to the cover and the wall. The cover and the backplate together at least partially provide a shielded air inlet configured to fluidly communicate with the air inlet pipe via the air inlet opening of the backplate. The cover defines a second exhaust gas opening configured to be in fluid communication with the exhaust pipe via the first exhaust gas opening of the backplate. The apparatus further includes a nozzle configured to couple with the backplate, the cover, or both, in at least two orientations. The nozzle defines a flowpath therethrough configured to fluidly communicate with the exhaust pipe via the first and second exhaust gas openings. The flowpath is oriented at an acute angle with respect to the exhaust pipe when the nozzle is coupled with the backplate, the cover, or both and the backplate is coupled with the vent pipes.

BRIEF DESCRIPTION OF THE DRAWINGS

The accompanying drawings, which are incorporated in and constitute a part of this specification, illustrate aspects of the present teachings and together with the description, serve to explain principles of the present teachings. In the figures.

DETAILED DESCRIPTION

Reference will now be made in detail to various embodiments of the present teachings, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific implementations in which may be practiced. These implementations are described in sufficient detail to enable those skilled in the art to practice these implementations and it is to be understood that other implementations may be utilized and that changes may be made without departing from the scope of the present teachings. The following description is, therefore, merely exemplary.

Figure 1:
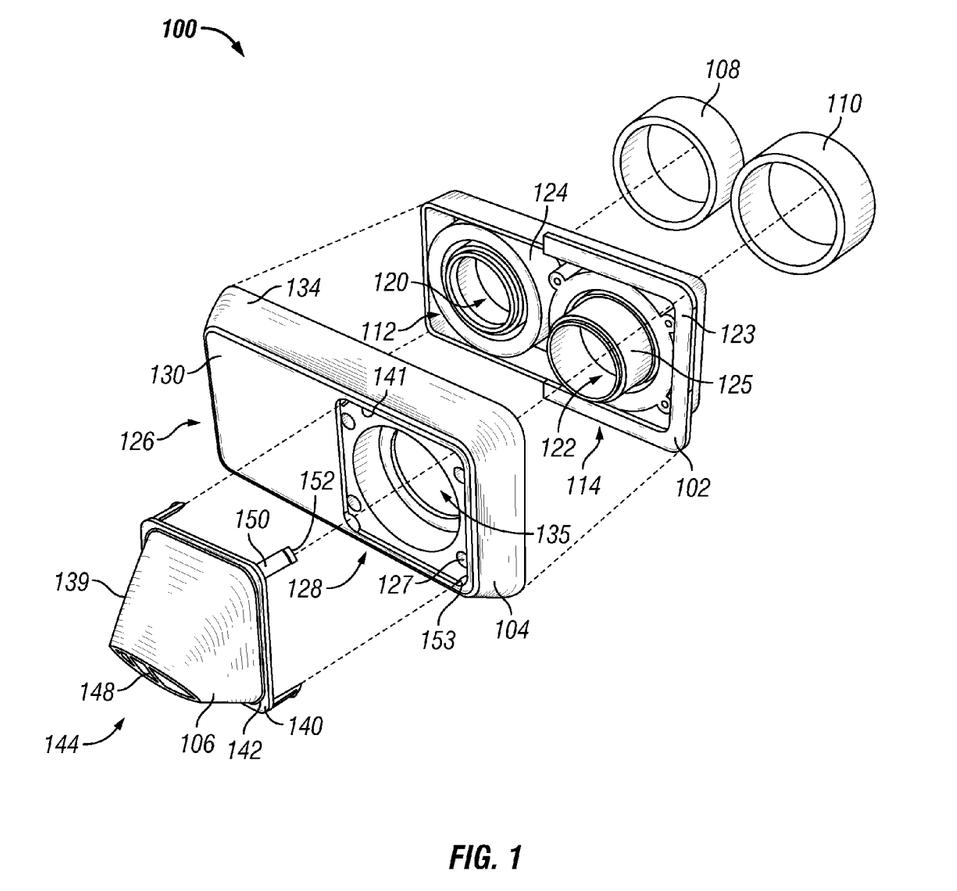
FIG. 1 illustrates an exploded, front perspective view of a vent terminal, according to an embodiment.
Figure 2:
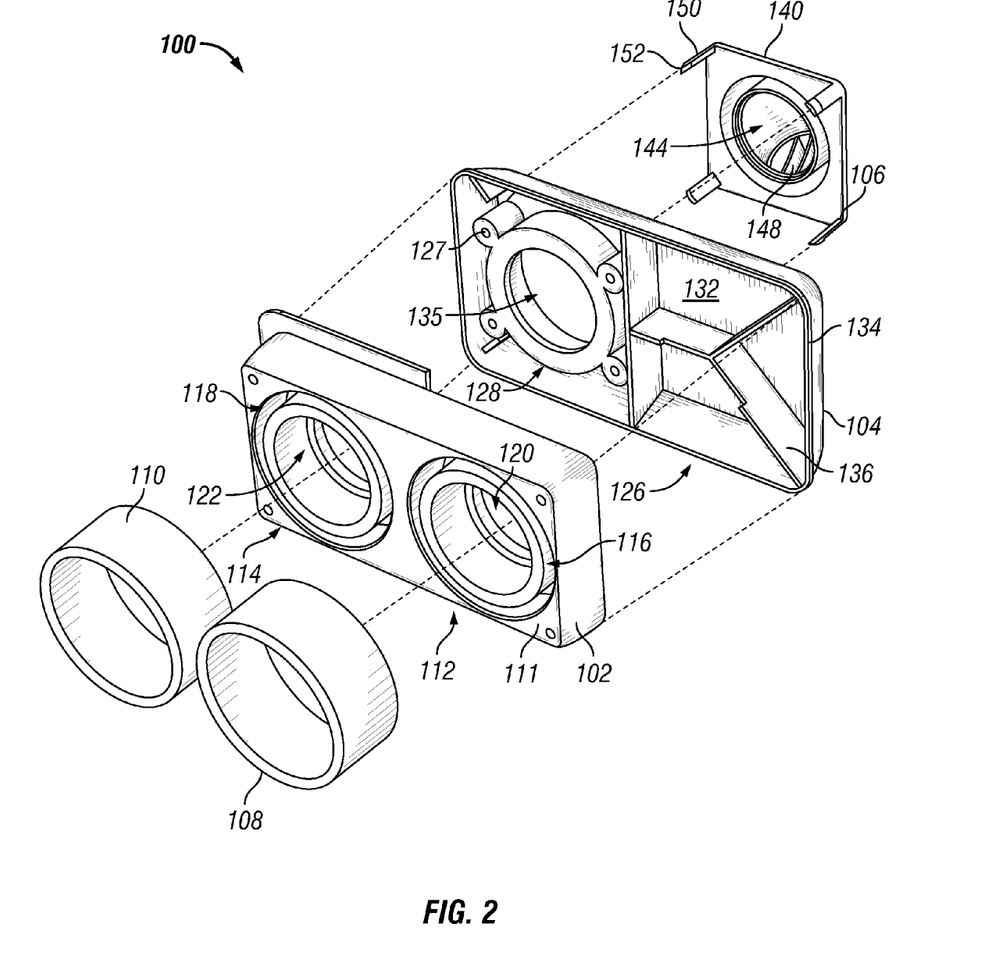
FIG. 2 illustrates an exploded, rear perspective view of the vent terminal, according to an embodiment.
Figure 3A:
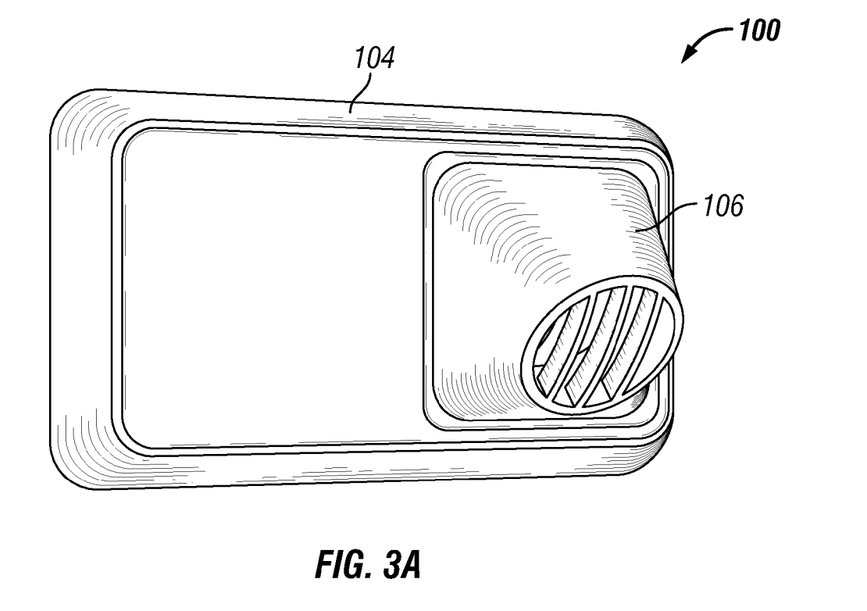
FIGS. 3A-3D illustrate front perspective views of four configurations of a nozzle of the vent terminal, according to one or more embodiments.
Figure 3B:
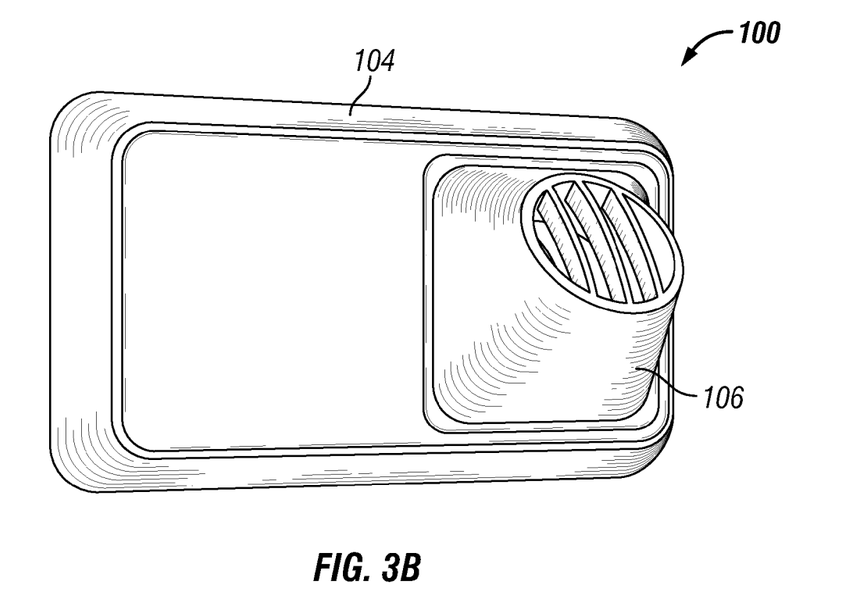
Figure 3C:
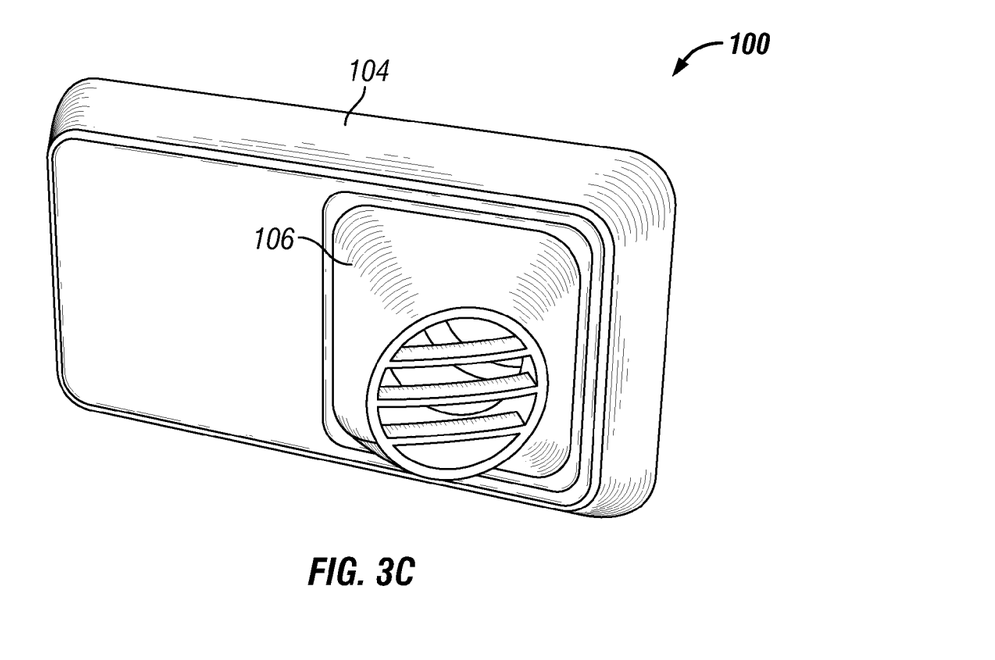
Figure 3D:
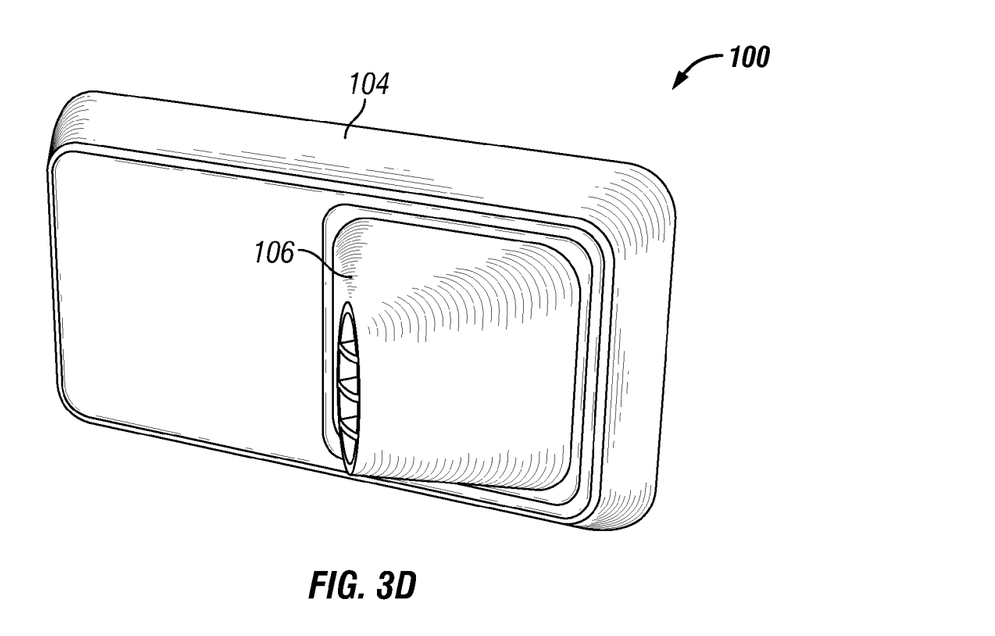

FIGS. 1 and 2 illustrate exploded, front and rear perspective views, respectively, of a vent terminal 100, according to an embodiment. The vent terminal 100 may be configured for use with a furnace, such as a condensing gas furnace, or any other type of HVAC system. Further, the vent terminal 100 generally includes a body, which, as shown, may be segmented into a backplate 102 and a cover 104. The vent terminal 100 may also include a nozzle 106, which may be connectable to the cover 104, the backplate 102, or both and may be oriented at an acute angle with respect to the body, e.g., the cover 104.

The vent terminal 100 may couple with (e.g., fit over or in, connect to, secure around or in, etc.) two or more vent pipes, for example, an air intake pipe 108 and an exhaust pipe 110. In an example, the air intake pipe 108 may be configured to provide air (or another oxidant) to a fuel (e.g., fossil fuel) combustion chamber of a furnace, boiler, or any other type of HVAC system, while the exhaust pipe 110 may be configured to remove combustion gasses therefrom. Accordingly, in some cases, the vent pipes 108, 110 may be referred to as "combustion" vent pipes 108, 110, given this function. Moreover, in some embodiments, the vent pipes 108, 110 may be known in the art as "direct vent" pipes; however, it will be appreciated that this is but one embodiment among many contemplated. In several specific embodiments, the vent pipes 108, 110 may be part of a vent system for a Category IV direct-vent, gas-fired furnace, a Category IV direct-vent, gas-fired boiler, or a Category IV direct-vent, gas-fired water heater. Further, the vent terminal 100 may provide for fluid communication therethrough, such that the exhaust pipe 110 communicates with the nozzle 106 via an exhaust opening, as will be described in greater detail below.

The nozzle 106, being oriented at an angle with respect to the flow of exhaust gas entering the vent terminal 100, may direct air from the exhaust pipe 110 to proceed at about the same angle, such that the exhaust gas is turned to proceed non-perpendicularly to the wall. Further, the nozzle 106 may be connectable to the cover 104 in at least two configurations, and may be releasable to facilitate reconfiguration of the nozzle 106 with the cover 104. In other embodiments, however, the nozzle 106 may be coupled with the cover 104, the backplate 102, or both via an integral-formation process (e.g., molding or casting), such that the nozzle 106, the cover 104, and/or the backplate 102 are a unitary structure. In at least one embodiment, the nozzle 106 may form an ocular, ball-in-socket, or other type of connection with the body, such that the nozzle 106 angle is adjustable while remaining connected with the cover 104. In other embodiments, the nozzle 106 may be rotatable relative the body. As such, embodiments of the vent terminal 100 may provide an aesthetic cover for intake and exhaust pipes 108, 110 of an HVAC system providing for angular redirection of the exhaust gas.

Referring now in greater detail to the illustrated embodiment, the backplate 102 may be configured to be secured to a wall of a building, for example, using fasteners (e.g., bolts or screws), adhesive, or the like. In other embodiments, the backplate 102 may be secured to the pipes 108, 110, in lieu of or in addition to a secured connection directly to the wall. It will be appreciated that a variety of connection methods and devices may be employed for coupling (e.g., securing) the backplate 102 to the wall and/or the pipes 108, 110, without departing from the present disclosure.

The backplate 102 may further include a rear face 111, which may face the pipes 108, 110 and/or the wall, an intake section 112, and an exhaust section 114. The backplate 102 may further include pipe couplings on the rear face 111, one each for the intake section 112 and the exhaust section 114 to connect with the air intake pipe 108 and the exhaust pipe 110, respectively. For example, the pipe couplings may each include an annular groove 116, 118, which may be sized to receive one of the pipes 108, 110. Elastomeric gaskets, other types of seals, sealants, or the like may be provided in the annular grooves 116, 118, for example, at the bottom thereof, to provide a positive seal between the pipes 108, 110 and the backplate 102; however, in other embodiments, such seals may be unnecessary and omitted.

The backplate 102 may define an opening 120 therethrough, for example, in the intake section 112, and an opening 122 therethrough, in the exhaust section 114. The intake section 112 and an exhaust section 114 may be laterally adjacent and may be integrally formed or separate and coupled together using any suitable process or device. The openings 120, 122 may fluidly communicate with the pipes 108, 110, respectively, so as to provide a fluid conduit through the backplate 102. The openings 120, 122 may extend transversely to the backplate 102, but in other embodiments, may extend at any angle, may include bends, or the like. The opening 120 in the intake section 112 may terminate with a front face 124 of the backplate 102, so as to be generally flush therewith. The opening 122 in the exhaust section 114 may be partially defined by an extension 125, extending forward from the front face 124. The backplate 102 may also include a flange 123 at least partially surrounding the extension 125.

The cover 104 may be configured to couple with the backplate 102, for example, using fasteners, such as screws received through bores 127, or using adhesives. The provision of a separate cover 104 for the body may allow the aesthetic cover 104 to conceal the pipes 108, 110, the backplate 102, the fasteners securing the backplate 102 to the wall, and/or other components of the backplate 102 that, if exposed, may provide an unfinished aesthetic. However, in some embodiments, the cover 104 and the backplate 102 may be a single piece, such that the backplate 102 and the cover 104 are configured to be secured to the wall and/or the pipes 108, 110 together. In other embodiments, additional structures may be interposed between the backplate 102 and the cover 104, while the backplate 102 and the cover 104 are still considered "coupled together," as the term is used herein. Furthermore, the cover 104 and the backplate 102 may be considered parts of "a body" of the vent terminal 100, regardless of whether they are actually connected together.

The cover 104 may include an intake section 126 and an exhaust section 128, which may be laterally adjacent. The intake section 126 and the exhaust section 128 may be integrally formed or separate and coupled together using any suitable process or device. Further, the cover 104 may include a front face 130 and a rear face 132, with the rear face 132 being positioned opposite the front face 130. The cover 104 may also include a sidewall 134, which may extend rearward from the front and rear faces 130, 132 so as to receive a portion of the backplate 102 when the vent terminal 100 is assembled.

When assembled, the rear face 132 of the cover 104 may be configured to be proximal the front face 124 of the backplate 102, such that the backplate 102 is disposed between the cover 104 and the wall. Further, the intake sections 112, 126 and the exhaust sections 114, 128 may be aligned. The exhaust section 128 of the cover 104 may provide an opening 135, which may be sized to receive the extension 125, so as to provide a fluid conduit through the cover 104 and through the backplate 102, to the exhaust pipe 110. Accordingly, the openings 122 and 135 may together define an exhaust opening extending through the vent terminal 100 for communicating with the exhaust pipe 110.

The intake section 126 of the cover 104 may cooperate with the backplate 102 to provide a shielded air inlet. For example, the cover 104 may include one or more ribs 136 extending rearward from the rear face 132. The ribs 136 may be sized such that the ribs 136 abut the front face 124 of the backplate 102 when the cover 104 and the backplate 102 are assembled, so as to maintain a gap between the cover 104 and the backplate 102. This gap may extend along the sidewall 134, such that air is received in the opening 120 by proceeding between the sidewall 134 of the cover 104 and the backplate 102 and between the rear face 132 of the cover 104 and the front face 124 of the backplate 102. Further, the sidewall 134 and/or the rear face 132 may contact the flange 123 of the backplate 102, so as to limit and/or prevent intake air flow across the extension 125 and/or stabilize the position of the cover 104 with respect to the backplate 102. Accordingly, the aligned intake sections 112, 126 may provide the shielded air inlet, promoting separation between the exhaust gas and the inlet air, while serving to conceal the air intake pipe 108. In other embodiments, the shielded air inlet may be provided by other structures configured to promote such separation; for example, with nozzles, elbows, ducted extensions, partitions, and/or the like.

Turning to the nozzle 106, the nozzle 106 may be configured to secure to the cover 104, for example, at the exhaust section 128, such that the nozzle 106 extends forward from the front face 130. The nozzle 106 may include an angled section 139 and a plate 140. The plate 140 may be received into a complementarily-shaped recess 141 in the front face 130 of the cover 104, such that the plate 140 is flush with the front face 130.

The angled section 139 may define a truncated, oblique, conical shape, in which the central axis extends at an acute angle with respect to the plate 140. Further, the angled section 139 may meet the plate 140 to form a base 142. The base 142 of the angled section 139 may be circular, square (as illustrated), elliptical, rectangular, otherwise polygonal, or any other suitable shape. Further, the nozzle 106 may define a flowpath 144 therethrough, which may have a generally constant cross-sectional area to avoid pressure drops, but in other embodiments, may have a decreasing or increasing flowpath area along at least a portion of the angled section 139 proceeding away from the plate 140. Accordingly, the nozzle 106 may be converging, diverging, or converging-diverging.

In at least some embodiments, the angle of the angled section 139 of the nozzle 106 may be any acute angle with respect to the direction at which the exhaust gas initially proceeds through the opening 122. Such angle may be referred to as a "turning angle." For example, the angle may be between about 1 degree and about 89 degrees, about 10 degrees and about 80 degrees, about 25 degrees and about 65 degrees, about 35 degrees and about 55 degrees, or about 45 degrees. In one specific embodiment, the angle may be about 22.5 degrees.

Further, the nozzle 106 may have a guard provided, for example, by a series of bars 148. The guard may be configured to prevent entrance of debris, pests (e.g., rodents), and/or the like into the nozzle 106. The bars 148 may take any suitable cross-sectional shape, such as elongated, airfoil, tapered, or the like. Further, the bars 148 may be adjustable, so as to further provide directional adjustment of the exhaust gas proceeding through the nozzle 106 and/or to restrict flow through the nozzle 106, e.g., during long periods of disuse (e.g., in the summer months).

The nozzle 106 may be secured or otherwise coupled to the cover 104, and, more particularly, to the exhaust section 128 of the cover 104, using suitable fasteners. For example, the fasteners may include flexible extensions 150, which may have tapered shoulders 152 at the distal ends thereof. The flexible extensions 150 and the tapered shoulders 152 may be received into slots 153 defined in the cover 104, such that the tapered shoulders 152 slide into engagement with complementarily-shaped shoulders (or with the rear face 132 of the cover 104, or with a structure provided by the backplate 102) and secured into place therewith. In other embodiments, the nozzle 106 may be coupled with the cover 104 using any other suitable fastening structures or devices, such as screws, bolts, adhesives, and/or the like. Further, the plate 140 of the nozzle 106 may conceal the fasteners and the associated bores 127 employed to fasten the cover 104 to the backplate 102.

In operation of one or more of the embodiments of the vent terminal 100, the opening 122 of backplate 102 may receive exhaust gas from the exhaust pipe 110. The exhaust gas may then pass through the backplate 102 via the opening 122 and proceed to the opening 135 in the exhaust section 128 of the cover 104. The exhaust gas may proceed through the cover 104 via the opening 135 and into the flowpath 144 defined in the nozzle 106. The angled section 139 of the nozzle 106 may turn the exhaust gas, such that it proceeds at an acute angle with respect to its direction upon entering the vent terminal 100. In various embodiments, such angle may also be defined and/or considered relative to the wall, body, backplate 102, and/or cover 104, etc.

On the intake side, the cover 104 may receive air through the gap between the sidewall 134 and the backplate 102, as described above. The intake air may then proceed through the opening 120 and thus through the backplate 102, to the air intake pipe 108. The intake air may be held separate from the exhaust gas within the area intermediate the cover 104 and the backplate 102 by the extension 125, which contains the exhaust gas therein.

FIGS. 3A-3D illustrate four potential configurations for the nozzle 106 of the vent terminal 100. For example, the four configurations of the nozzle 106 may rotated about 90 degrees apart, with the nozzle 106 directing air at an angle downwards (FIG. 3A), upwards (FIG. 3A), left (FIG. 3C), or right (FIG. 3D), depending on which way the nozzle 106 is secured to the cover 104. Placing the four extensions 150 (FIGS. 1 and 2) at symmetric positions (e.g., at the corners of the plate 140) may facilitate easy shifting between the positions. Further, in some embodiments, the nozzle 106 may be secured to the cover 104 or the backplate 102 using bolts, received into an annular slot disposed in the cover 104 or the backplate 102. In such an embodiment, the nozzle 106 may have any number of orientations or configurations, as the nozzle 106 is rotatable to the desired position and then fastened into place. In still other embodiments, any number of configurations may be provided using extensions 150, slots, bolts, adhesives, other fasteners, or the like.

Figure 4:
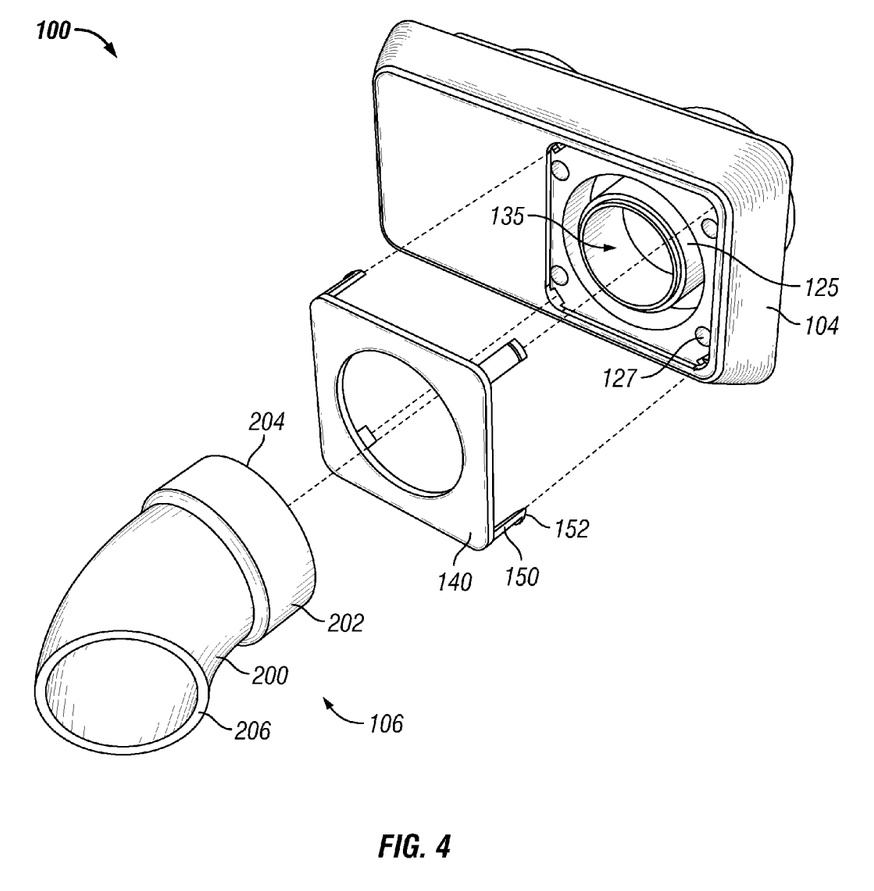
FIG. 4 illustrates a partially-exploded, front perspective view of another embodiment of the vent terminal.

FIG. 4 illustrates a partially-exploded front view of another embodiment of the vent terminal 100. As shown, the nozzle 106 of the vent terminal 100 may include an elbow 200, which serves to orient the nozzle 106 at the angle, in lieu of the angled section 139 (FIGS. 1-3D). In some embodiments, however, the elbow 200 may be provided in addition to the angled section 139. The opening 135 may be sized to match (or slightly exceed) the outer diameter of the end of the elbow 200, with the extension 125 being, for example, sized to be received within the inner diameter of the elbow 200. Accordingly, the elbow 200 may be received into the opening 135, fitting into the annulus defined between the cover 104 portion defining the opening 135 and the extension 125.

The elbow 200 may further define a joint 202, proximal a first end 204 thereof, having an enlarged outer diameter with respect to a remainder of the elbow 200. Accordingly, when assembling the nozzle 106 with the cover 104, the joint 202 of the elbow 200 may be received into the opening 135 and around the extension 125. The plate 140 may then be received over a second end 206 of the elbow 200, and slid down along the elbow 200, until the tapered shoulders 152 and extensions 150 are received into the slots 153 of the cover 104.

In some embodiments in which the nozzle 106 includes the elbow 200, the nozzle 106 may be positioned in any number of positions. That is, the elbow 200 may be rotated, with respect to the cover 104. This may change the angle of discharge of the nozzle 106, thus changing the configuration or orientation of the nozzle 106. Moreover, the elbow 200 may provide any desired turn angle (i.e., the angle between the entrance to the elbow 200 at the end 204 and the exit from the elbow 200 at end 206). In one example, the turn angle may be any acute angle. For example, the turn angle may be about 45 degrees; however, any angle between 0 degrees and 90 degrees may be employed without departing from the scope of the present disclosure.

Figure 5:
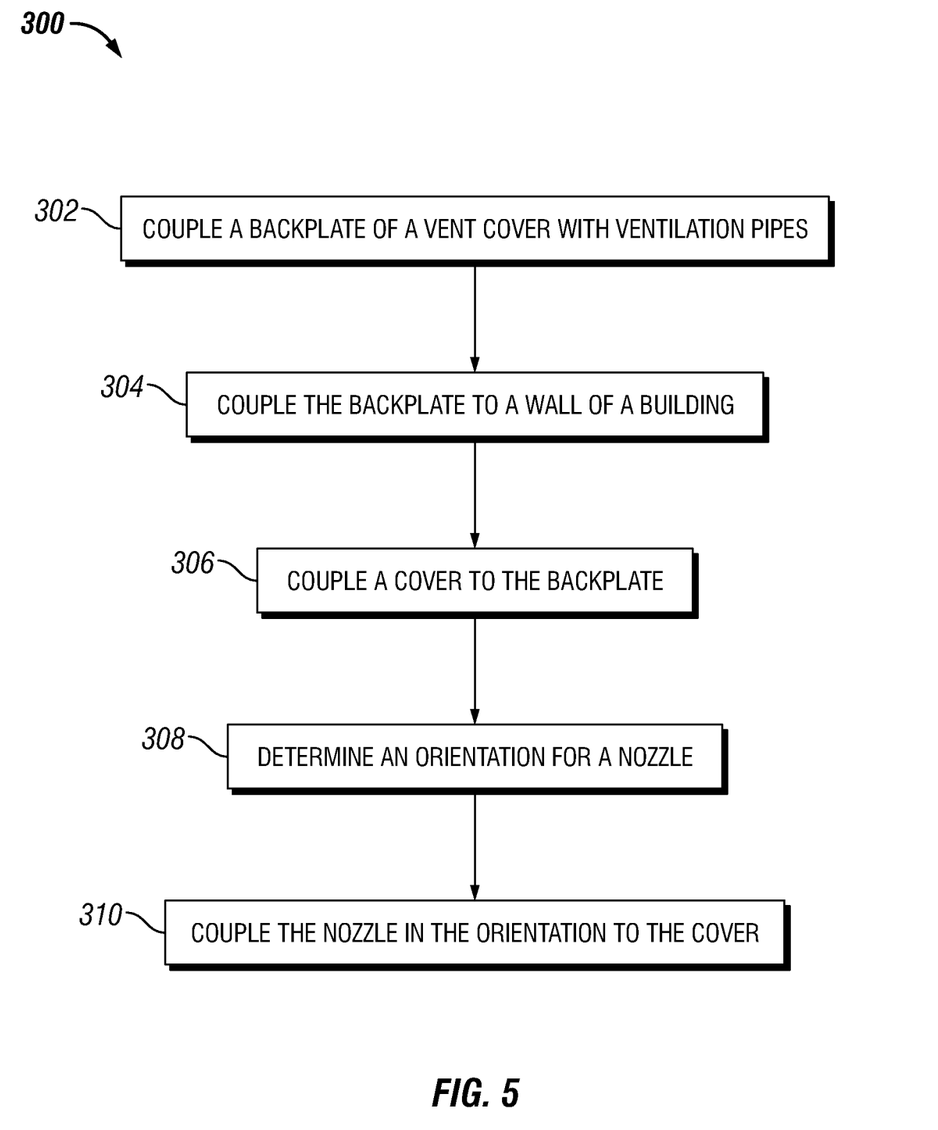
FIG. 5 illustrates a flowchart of a method for covering vent pipes of an HVAC system, according to an embodiment.

FIG. 5 illustrates a flowchart of a method 300 for covering vent pipes of a vent system for an HVAC system (e.g., a furnace). The method 300 may proceed by operation and/or installation of one or more embodiments of the vent terminal 100 described above and, thus, may be best understood with reference thereto. The method 300 may include coupling a backplate of a vent terminal to the vent pipes, as at 302. The method 300 may also include coupling the backplate to a wall of a building, as at 304. The backplate may define an air intake opening aligned with an air intake pipe of the vent pipes and defining a first exhaust opening aligned with an exhaust pipe of the vent pipes. The method 300 may also include coupling a cover to the backplate, as at 306. The cover and the backplate may together define a shielded air intake communicating with the air intake pipe via the air intake opening. The cover may also define a second exhaust opening aligned with the first exhaust opening.

The method 300 may also include determining an orientation for a nozzle by choosing among a plurality of possible orientations, as at 308. Determining the orientation may proceed by adjusting the angle at which the nozzle is coupled to the cover, or may proceed by adjusting an ocular joint of the nozzle. It will be appreciated that such determination may take place before, during, or after design, manufacture, installation, assembly or any other process or portion of the method 300. The method 300 may further include coupling the nozzle in the orientation to the cover, as at 310. Accordingly, the nozzle may fluidly communicate with the exhaust pipe via the first and second exhaust gas openings and is configured to direct air received therefrom at an acute angle with respect to the wall.

The method 300 may also include spacing the backplate from the cover using a rib defined on a rear face of the backplate. This may, for example, ensure a gap is provided to support the shielded air intake. Further, the method may include disposing a sidewall of the cover around the backplate, such that the sidewall is offset from the wall by a gap, the gap configured to provide the shielded air inlet.

While the present teachings have been illustrated with respect to one or more implementations, alterations and/or modifications may be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings.

It will be appreciated that structural components and/or processing stages may be added or existing structural components and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein.

The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side," "higher," "lower," "over," "top," and "under" are defined with respect to the conventional plane or working surface being on the top surface of the workpiece, regardless of the orientation of the workpiece.

What is claimed is:

1. A vent terminal for covering combustion vent pipes of an HVAC system, comprising:
    a body defining a shielded air inlet configured to fluidly communicate with an air intake pipe, and an exhaust opening configured to fluidly communicate with an exhaust pipe; and a nozzle defining a flowpath therethrough, wherein, when the exhaust opening of the body is in fluid communication with the exhaust pipe and the nozzle is coupled with the body, the flowpath is in fluid communication with the exhaust pipe via the exhaust opening and the flowpath is oriented at an acute angle relative to the exhaust pipe;

wherein the body further comprises:

a backplate configured to be secured to a wall, the air intake pipe, the exhaust pipe, or a combination thereof, and having first and second pipe couplings for coupling to the air intake pipe and the exhaust pipe, respectively; and a cover coupled with the backplate, such that the backplate is positionable generally between the cover and the wall;

wherein the cover comprises a rear face and a sidewall extending rearward therefrom, wherein a gap between the sidewall and the backplate provides at least a portion of the shielded air inlet.

2. A vent terminal for covering combustion vent pipes of an HVAC system, comprising:

a body defining a shielded air inlet configured to fluidly communicate with an air intake pipe, and an exhaust opening configured to fluidly communicate with an exhaust pipe; and a nozzle defining a flowpath therethrough, wherein, when the exhaust opening of the body is in fluid communication with the exhaust pipe and the nozzle is coupled with the body, the flowpath is in fluid communication with the exhaust pipe via the exhaust opening and the flowpath is oriented at an acute angle relative to the exhaust pipe;

wherein the body further comprises:

a backplate configured to be secured to a wall, the air intake pipe, the exhaust pipe, or a combination thereof, and having first and second pipe couplings coupled to the air intake pipe and the exhaust pipe, respectively; and a cover coupled with the backplate, such that the backplate is positionable generally between the cover and the wall;

wherein the cover comprises a rear face and a sidewall extending rearward therefrom, and the rear face faces the backplate and is separated therefrom by a gap, wherein the gap provides at least a portion of the shielded air inlet;

wherein the cover comprises a rib extending rearward from the rear face and configured to abut a front face of the backplate, wherein the rib is configured to maintain the gap between the backplate and the cover.

3. The vent terminal of claim 1, further comprising an extension extending forward from a front face of the backplate, the extension at least partially defining the exhaust opening.

4. The vent terminal of claim 1, wherein the nozzle is configured to couple to the cover.

5. The vent terminal of claim 1, wherein the nozzle comprises an oblique, truncated conical angled section.

6. The vent terminal of claim 1, wherein the nozzle comprises an elbow.

7. The vent terminal of claim 6, wherein the elbow is configured to be rotatable with respect to the body when the nozzle is coupled to the body.

8. The vent terminal of claim 1, wherein the nozzle is configured to be coupled to the body in at least two orientations separated by at least 90 degrees.

9. The vent terminal of claim 1, wherein the acute angle is between about 20 degrees and about 60 degrees.

10. The vent terminal of claim 1, wherein the acute angle is fixed at least when the nozzle is coupled to the body.

11. A method for covering vent pipes of an HVAC system, comprising:

coupling a backplate of a vent terminal to the vent pipes, the backplate defining an air intake opening aligned with an air intake pipe of the vent pipes and defining a first exhaust opening aligned with an exhaust pipe of the vent pipes;

coupling a cover to the backplate so as to define a shielded air intake communicating with the air intake pipe via the air intake opening, wherein the cover defines a second exhaust opening aligned with the first exhaust opening;

determining an orientation for a nozzle from a plurality of possible orientations; and coupling the nozzle in the orientation to the cover, the backplate, or both, such that the nozzle fluidly communicates with the exhaust pipe via the first and second exhaust gas openings and is configured to direct exhaust gas received from the exhaust pipe at an acute angle with respect to the wall;

wherein coupling the cover to the backplate comprises disposing a sidewall of the cover proximate to the backplate, wherein a gap between the sidewall and the backplate at least partially provides the shielded air inlet.

12. A method for covering vent pipes of an HVAC system, comprising:

coupling a backplate of a vent terminal to the vent pipes, the backplate defining an air intake opening aligned with an air intake pipe of the vent pipes and defining a first exhaust opening aligned with an exhaust pipe of the vent pipes;

coupling a cover to the backplate so as to define a shielded air intake communicating with the air intake pipe via the air intake opening, wherein the cover defines a second exhaust opening aligned with the first exhaust opening;

determining an orientation for a nozzle from a plurality of possible orientations;

coupling the nozzle in the orientation to the cover, the backplate, or both, such that the nozzle fluidly communicates with the exhaust pipe via the first and second exhaust gas openings and is configured to direct exhaust gas received from the exhaust pipe at an acute angle with respect to the wall; and spacing the backplate from the cover using a rib defined on a rear face of the cover.

13. The method of claim 11, further comprising adjusting the orientation of the nozzle while the nozzle is coupled with the cover, backplate, or both.

14. The method of claim 11, further comprising exhausting combustion gases from the HVAC system through the exhaust pipe and the nozzle.

15. An apparatus for covering vent pipes of a condensing gas furnace, comprising:

a backplate configured to be secured to a wall and comprising first and second pipe couplings, the first pipe coupling configured to couple with an air intake pipe of the vent pipes, the second pipe coupling configured to couple with an exhaust pipe of the vent pipes, the backplate defining an air inlet opening configured to fluidly communicate with the air inlet pipe and a first exhaust gas opening configured to fluidly communicate with the exhaust pipe;

a cover coupled with the backplate such that the backplate is configured to be disposed intermediate to the cover and the wall, the cover and the backplate together at least partially providing a shielded air inlet configured to fluidly communicate with the air inlet pipe via the air inlet opening of the backplate, the cover defining a second exhaust gas opening configured to be in fluid communication with the exhaust pipe via the first exhaust gas opening of the backplate; and a nozzle configured to couple with the backplate, the cover, or both, in at least two orientations, the nozzle defining a flowpath therethrough configured to fluidly communicate with the exhaust pipe via the first and second exhaust gas openings, the flowpath being oriented at an acute angle with respect to the exhaust pipe when the nozzle is coupled with the backplate, the cover, or both and the backplate is coupled with the vent pipes;

wherein the cover comprises a rear face and a sidewall extending rearward therefrom, wherein a gap between the sidewall and the backplate provides at least a portion of the shielded air inlet.

16. The apparatus of claim 15, wherein the nozzle is connectable to the cover, the backplate, or both in at least four orientations.

17. The apparatus of claim 15, wherein the acute angle is between about 20 degrees and about 60 degrees.

* * * * *